United States Patent
Masberg et al.

[11] Patent Number: 5,921,149
[45] Date of Patent: Jul. 13, 1999

[54] SYSTEM AND PROCESS FOR ACTIVE VIBRATION DAMPING

[75] Inventors: Ullrich Masberg, Rosrath; Klaus-Peter Zeyen, Cologne, both of Germany

[73] Assignee: ISAD Electronic Systems GmbH & Co. KG, Germany

[21] Appl. No.: 08/702,624

[22] PCT Filed: Feb. 24, 1995

[86] PCT No.: PCT/EP95/00680

§ 371 Date: Nov. 4, 1996

§ 102(e) Date: Nov. 4, 1996

[87] PCT Pub. No.: WO95/23301

PCT Pub. Date: Aug. 31, 1995

[30] Foreign Application Priority Data

Feb. 28, 1994 [DE] Germany ............................. 44 06 482
Jul. 5, 1994 [DE] Germany ............................. 44 23 577

[51] Int. Cl.[6] .................................................... F16F 15/10
[52] U.S. Cl. ............................................................ 74/574
[58] Field of Search ....................... 74/574, 572; 701/111, 701/110; 364/574, 572

[56] References Cited

U.S. PATENT DOCUMENTS

| | | |
|---|---|---|
| 4,977,508 | 12/1990 | Tanaka et al. . |
| 5,140,868 | 8/1992 | Mizuno et al. ............................. 74/574 |
| 5,185,543 | 2/1993 | Tebbe ..................................... 74/574 X |
| 5,664,534 | 9/1997 | Schmitz ................................. 74/572 X |

FOREIGN PATENT DOCUMENTS

| | | |
|---|---|---|
| 0 017 724 A1 | 10/1980 | European Pat. Off. . |
| 0 033 191 A2 | 8/1981 | European Pat. Off. . |
| 0 544 576 A1 | 6/1993 | European Pat. Off. . |
| 0 604 979 A2 | 7/1994 | European Pat. Off. . |
| 2.102.400 | 4/1972 | France . |
| 2.140.904 | 1/1973 | France . |
| 2.707.702 | 1/1995 | France . |
| 21 23 831 B2 | 10/1975 | Germany . |
| 22 28 516 B2 | 1/1976 | Germany . |
| 30 05 561 A1 | 8/1980 | Germany . |
| 32 30 607 A1 | 2/1984 | Germany . |
| 37 37 192 A1 | 7/1988 | Germany . |
| 41 00 937 A1 | 8/1991 | Germany . |
| 0001431 | 1/1980 | Japan ..................................... 74/574 |
| 0072935 | 6/1980 | Japan ..................................... 74/574 |
| 0307542 | 12/1989 | Japan ..................................... 74/574 |
| 403149431 | 6/1991 | Japan ..................................... 74/574 |
| 403168442 | 7/1991 | Japan ..................................... 74/574 |
| WO 92/07411 | 4/1992 | WIPO . |

OTHER PUBLICATIONS

Japan (Abstract), No. 55–5454, dated Jan. 16, 1980.
Japan (Abstract), No. 61200333, dated Sep. 4, 1986.
Japan (Abstract), No. 57043577, dated Mar. 11, 1982.
Japan (Abstract), No. 55–1431, dated Jan. 8, 1980.
Japan (Abstract), No. 61135937, dated Jun. 23, 1986.
Japan (Abstract), No. 62171460, dated Jul. 28, 1987.
Japan (Abstract), No. 58–126434, dated Jul. 27, 1983.
Japan (Abstract), No. 4316760, dated Nov. 9, 1992.
Japan (Abstract), No. 62255534, dated Nov. 7, 1987.

*Primary Examiner*—Charles A. Marmor
*Assistant Examiner*—Mary Ann Battista
*Attorney, Agent, or Firm*—Leydig, Voit & Mayer, Ltd.

[57] ABSTRACT

An active vibration damping system for a drive unit having at least one drive shaft is provided. The vibration damping system includes a flywheel which comprises a movable base element of a linear electric motor that acts on the rotation of the shaft. The linear electric motor consists of a linear machine which generates a traveling magnetic field. The turning direction of the traveling magnetic field chosen relative to the turning direction of the crankshaft such that when unacceptably low momentary turning rates are sensed, a thrust force is applied to the flywheel and when unacceptably high momentary turning rates are sensed, a retarding force is applied until an evening up of the crankshaft rotation or a rotary vibration damping is achieved.

20 Claims, 2 Drawing Sheets

SYSTEM AND PROCESS FOR ACTIVE VIBRATION DAMPING

FIELD OF THE INVENTION

The invention relates to a system and process for active vibration damping of a drive unit having a rotating shaft, and more particularly to a system that maintains turning-speed irregularities of the rotating shaft within selected values by utilizing a flywheel or other member seated on the shaft as a movable base element of an electrical machine and a system for its execution.

BACKGROUND OF THE INVENTION

Substantial sound or noise sources in a motor vehicle may include the internal-combustion engine itself as well as the connected drive components, such as crankshaft, drive shaft, and also the exhaust installation, tire noises, etc. One of the principal sources of noise in a motor vehicle are shafts driven from a drive unit or situated therein. These include the crankshaft, the Cardan shaft, the drive shaft, etc. Internal-combustion engine drive units have, in driving operation, deviations from a predetermined desired turning rate in many or all turning rate zones. Such rotation irregularities or turning-rate disturbances, are caused, for example, by non-uniform combustion in a one-cylinder configuration or by "dropping out" of one cylinder in a multicylinder configuration. They typically cause undesired interference vibrations of the off-drive shaft, especially of the crankshaft, which are transferred to other components of the vehicle and often result in a troublesome noise level.

Some systems have been developed for reduction of noise levels associated with a vehicle during its driving operation and experienced by the vehicle occupants. For example, known systems for noise reduction in a vehicle by active vibration damping include DE 39 39 828 C2 and EP 0 372 590 B1. These documents describe systems that detect the phase and amplitude of undesired vibration from all the sound sources and superimpose an opposite vibration to the source. For example, when the phase of a vibration and amplitude is detected from the vehicle body work, the system superimposes an equal-amplitude additional counter vibration. These systems require an additional corresponding vibration source which transfers the counter vibrations, for example, to the vehicle body-work. The systems for active vibration damping described in the publications DE 41 41 637 A1 and G 91 04 812 U1 operate in substantially the same fashion.

Other documents, DE 36 23 627 A1 and DE 32 30 607 A1, describe methods for monitoring the turning-rate behavior in the drive-line of an internal-combustion engine to detect rotation irregularities. From these detected irregularities, a control arrangement generates signals for controlling a correcting element, possibly in the form of a slip coupling or a three-phase current electric motor where the coupling or rotor of the electric motor is coupled with the crankshaft of the internal-combustion engine. Further, DE-OS 30 05 561 discloses a vibration damping system with an eddy current brake utilized as the correcting element. The vibration damping system disclosed in publication DE 41 00 937 A1 measures possible rotation irregularities of a crankshaft and damps these irregularities with an alternating-current synchronous motor.

Patent Abstracts of Japan, Volume 4, No. 29 (M-002), Mar. 14, 1980, disclose a device for active vibration damping of an internal-combustion motor, the crankshaft of which is equipped with a flywheel. A magnet yoke grips the flywheel in a small zone of the flywheel circumference. The magnet yoke and the flywheel together provide an eddy-current brake utilized as a correcting member.

Other known systems, as noted in the following documents, are directed to partial aspects of active vibration damping. For example, EP 70 553 B1 describes an electrical machine for influencing the turning rate of a gas turbine and DE 453 179 A1 describes a device for monitoring the turning rate of a turbine off-drive shaft in a current-producing generator.

A principal disadvantage of these known vibration-damping systems is the requirement of additional relatively complicated vibration sources for the generation of counter vibrations. The success of noise suppression depends strongly on the location, the form and the material of the vehicle surfaces upon which the counter-vibrations are applied which further complicates such systems. Furthermore, the aforementioned correcting members for influencing shaft movement of a rotating shaft require great expenditures of space due to their structural size.

SUMMARY OF THE INVENTION

Accordingly, it is a general object of the invention to provide a system and process for active vibration damping which are less expensive than known methods and systems and are suited especially for motor vehicles and the like.

It is an additional object of the present invention to provide an active vibration damping system that minimizes additional weight of the vehicle.

It is a further object of the present invention to provide noise suppression in a motor vehicle or the like with the use of a compensating system that eliminates vibration disturbances due to rotational irregularities in a driven shaft.

The invention meets these objectives with an active vibration damping system including a correcting member provided as an electrical linear machine or a linear motor. A method according to the invention provides active vibration damping in drive units with at least one rotating shaft by limiting turning rate irregularities to within selected values. The method is performed with a flywheel seated on the shaft used as a movable element of a linear machine.

The invention prevents noise formation in drive shafts or the like by monitoring the potential disturbance source, the momentary value of the turning rate or the angular segment speed of the shaft, and provides sensing signals to a regulating or control circuit. The control circuit derives correction signals to regulate the momentary turning rate of the shaft within desired values. When possible deviations are detected, the system provides correction signals to automatically adjust or maintain the turn rate. Deviations from a predetermined desired value, therefore, are immediately corrected. The desired value usually corresponds there to the optimal noise conditions of a crankshaft in a motor vehicle, i.e., to a noiseless, or at least to a low-noise, travelling operation.

Rather than employing additional sources of vibration, the invention attacks and suppresses the vibration or noise sources involved directly, and suppresses the vibration disturbances caused by rotation irregularities of the rotating shafts at the point of origination. Accordingly, the formation of disturbance vibrations and the accompanying noises in the vehicle is avoided. The invention, therefore, pursues a different course than that of the earlier-described state of the art.

The invention provides further important advantages. The long term consequences of vibration stress applied to the drive shaft such as material fatiguing and perhaps "dropping-out" of the shaft are avoided. Further, the vibration system of the invention optionally replaces the rotary vibration eradicators hitherto used in vehicle technology. Such rotary vibration eradicators are known, for example, from EP O 250 913 A2 or from DE 89 07 426.2 U1 assigned to the assignee of the present invention. They are formed mainly as "passive" vibration additional masses fabricated of rubber and located concentrically about the shaft. They suffer the disadvantage that they are generally tunable only to one vibration frequency and, in addition to additional cost, they add to the overall vehicle weight.

In the preferred embodiment, the invention uses a linear machine to influence the rotation of the shaft. Such linear machines utilize the principle of electromagnetic induction or Lorentz force. They conventionally include a stationary base element (stator) and a moving base element (rotor) that are separated spatially and bodily by an air gap. The stator and rotor are linked with one another over a magnetic flux passing in common through the gap. At least one of the base elements generates the magnetic primary field with the aid of one or more exciter windings as a traveling magnetic field. The other base element includes one or more electric conductors. The primary field of the first base element traverses the gap separating the base elements and through flux linkage, induces a driving Lorentz force. The exciter windings may be arranged on the stationary (stator) or on the movable base element (rotor). Accordingly, any linear machine can be driven as a motor, or alternatively as a generator depending on the drive type and irregularity sensed.

The correcting member of the present invention uses the flywheel seated on a shaft of the drive unit as the rotor. An electromagnetic coupling between the rotor (constructed as a flywheel) and the stator of the linear machine transfers a compensating torque to the rotating shaft to compensate for rotation irregularities. The strength of the magnetic coupling and the corresponding thrust or retarding moment exerted on the shaft is controlled by altering the magnetic flux through the gap. This is achieved by changing the current supplied to the exciter coils of the electrical machine, and/or by altering the gap, inclusive of a medium present therein.

The present invention operates as a motor and as a generator depending on the application of vibration forces. In the preferred embodiment, the invention includes a switching arrangement which switches over the correcting member depending on the type of irregularities sensed. In this way, the linear machine is driven as an (accelerating) electric motor when turning-rate decreases are sensed. Alternatively, the linear machine is driven as a (braking) generator when turning-rate increases are sensed. The energy recovered during generator operation can be stored in the manner of conventional energy recovery with use of the same as a light machine.

In a preferred implementation of the invention used in conjunction with the crankshaft of a motor vehicle internal combustion engine, the invention includes a control arrangement that drives the correcting member, i.e., the linear machine, as an engine or drive unit starter.

Many internal-combustion engine drive units cannot start from their own strength. They must first be started by an external source such as the conventional starter and be ramped up to the motor turning rate required for self-operation.

It is only after this that they can continue to run from their own force. This requires, according to motor type, stroke volume, bearing friction, etc., a rather large starting torque to be provided by the starter. This is conventionally implemented with a gear on a massive inertia mass or a flywheel seated on the drive unit shaft—in the case of motor vehicles the crankshaft.

Conventional starters employ a battery-fed direct-current motor which transfers the necessary torque via a drive pinion to the flywheel. One common starter motor is a so-called direct-current series closure motor, i.e., an electrical direct-current motor wherein the exciter or stator winding is switched in series with the armature winding. In order to start the engine, the drive pinion of the series-connection motor is brought into engagement with a gear rim seated on the periphery of the flywheel disk under action of a magnetic switch-controlled engaging lever. After starting, this connection is again interrupted. A free-wheeling coupling adapted for overload protection is typically arranged between the armature of the series-connection motor and the drive pinion. This arrangement prevents the armature from being driven at an undesirably high turning rate during the starting of the internal-combustion engine. In further known starters, a meshing gear mechanically connects the armature of the series closure motor and the gear rim of the flywheel. The meshing gear facilitates "meshing" of the pinion into the gear rim. Thus these known starters are a component that is quite expensive and is frequently subject to repair. The flywheel is also an expensive component since it includes a gear rim for the engagement of the starter pinion on its outer circumference and other marks for the control of the ignition processes in the motor.

The aforementioned preferred further developments of the invention, particularly in their use for internal-combustion engines, yield several advantages. For example, the correcting member operable as a starter according to the invention is a compact and simple construction. It is, in a sense, constructed "around the flywheel." The weight and the dimensions in the motor zone of the motor vehicle are thereby dramatically reduced. The conventional starter for the motor vehicle, with its rotor, transmission gear and drive pinion become superfluous. Furthermore, the gear rim on the flywheel is eliminated, such that the flywheel is of a correspondingly simple construction with reduced production expenditure. Further, a mechanical "operative" transmission of the thrust or retarding moment onto the flywheel is avoided and it is replaced by a magnetic coupling linking the flywheel and stator. The thrust or damping process of the invention therefore eliminates contacting parts since the thrust or damping moment is developed from electromagnetic field forces. Furthermore, aside from the flywheel, no movable parts are utilized. The correcting member starter configuration is subject to reduced wear. Further, the conventional light machine is superfluous. As a result, therefore, the invention contemplates a single component to provide active vibration damping, starting or setting the drive unit into operation and a current supply. This involves a clear reduction in costs.

In order to achieve appropriate active vibration damping, the correcting member in the electrical machine, whether direct-current, alternating-current or three-phase-current machine, must transfer a sufficiently great thrust or retarding moment onto the flywheel of the drive unit in order to regulate shaft turning rate. In order to provide a starter operation for internal-combustion engines, there are especially well suited machine types that develop a strong torque and achieve a sufficiently high turning rate. The invention provides a linear machine, i.e., a rotating electric machine of a linear motor or linear drive structure.

The linear motor preferably is implemented as an induction motor with a short-circuit rotor, i.e., an asynchronous motor. Instead of a rotary field known, say, from such asynchronous motors, the exciter windings of the linear motor form a pure field of travel. The travelling magnetic field generated by the stator (or rotor) traverses the rotor (or stator) and induces therein annular or eddy-current flows. The corresponding magnetic fields are entrained with the travelling field and, as a result, exert the desired thrust force.

The flywheel seated on the rotating shaft preferably is adapted as the rotor of such a linear motor. The transfer of the thrust or retarding moment to the flywheel to influence the shaft turning rate occurs via an electromagnetic coupling between the flywheel and the stator of the linear motor. A high coupling efficiency is achieved when the gap between flywheel and stator of the linear motor is rather small, preferably on the order of 0.1 to 1.5 mm.

There are several advantages of linear motors. They are relatively simple and sturdy construction, require minimal maintenance, are easy to regulate, and they provide great thrust forces (up to 1000 N). Further, upon over-increase of momentary turning rate, the linear motor functions as a generator by returning energy into the network in the same manner that reversal of the direction of the travelling field retards movement of the rotating shaft.

In a rather simple implementation, the exciter coils generating the travelling field are disposed on the stator proximate to only one side of the flywheel, preferably only within a certain segment-type angular range of the flywheel. However, with rising demands on the required starting torque, the stator coils can be arranged to the full 360° scope. There the coils can be distributed uniformly or non-uniformly on the one side of the flywheel. Alternatively, the coils can be arranged on both sides of the flywheel for increased starting torque. The stator coils, therefore, may be distributed within selected angular ranges or over the entire circumference on one or both sides of the flywheel. The linear motor of the invention is simply adapted for providing different output ranges.

The flywheel is preferably fabricated of a metal such as iron. In order further to increase conductively, the flywheel is coated or covered with a material of high conductivity, i.e., copper, and is disposed on the exterior surfaces disposed parallel to the stator coils. The eddy currents induced in the conductive layer develop a secondary magnetic field which, as with the primary magnetic field, is perpendicular to the gap plane to ensure an optimal degree of coupling. Alternatively, short-circuited rotor windings may be arranged on the flywheel in such manner that the primary field and the secondary field are optimally interlinked.

This arrangement achieves a substantial increase in the resulting thrust or retardation force. The eddy currents induced in the flywheel are disbursed undisturbed within the highly conductive layer or in the rotor windings, so that the induced magnetic field is correspondingly greater to provide a reinforced interaction with the exciter field.

Conventional linear motors provide a resulting thrust or retardation forces approximately proportional to the electrical conductivity of the material of the current-conducting rotor layers. Further, heat losses, namely, so-called eddy-current losses, in the flywheel are reduced to a minimum.

In respect to production, it is especially favorable to construct the flywheel as a circular steel disk and to coat the external surfaces facing the air gap with a copper plate.

In order to achieve further increase in the thrust or retardation force of the correcting member, in a further preferred embodiment, rotor coils acted on with current are arranged in or on the flywheel in such manner that their magnetic field stands perpendicular to the gap plane.

Especially in the case of great deviations from desired turning rates it is expedient to construct the flywheel in such manner that it has a T-shaped cross section.

In this case, stationary exciter coils, for example, which generate the primary field can be arranged both laterally and also radially on the flywheel exterior. In this manner, the exciter coils "embrace" the T-shaped end zone of the flywheel—similarly as in the case of a high-speed magnetic suspended railway. In this manner there is achieved a strong magnetic coupling between exciter coils and flywheel with simultaneously compact and sturdy construction.

Alternatively the exciter coils can also be arranged in or on the flywheel and a material of high conductivity or short-circuited windings can be arranged on the stator of the linear motor. In this manner the functions of moved and stationary base element are simply exchanged in respect to the generation of primary or exciter field and secondary induced field with respect to the previously described arrangement. The exciter coils on the flywheel generate the travelling field, which induces eddy currents in the stator, in order in interaction with the travelling field to exert a thrust or retarding force on the flywheel.

This arrangement has the advantage that it can be adapted flexibly to the dimensions in the motor zone of a motor vehicle. In consequence of the traveling movement of the moving field, only the stator or the rotor coil arrangement has to span the path to be covered. The following executions are possible. The stator can extend concentrically about the entire circumference on one or both sides of the flywheel. It forms a ring or double ring. Simultaneously rotor coils are disposed in or on the flywheel exclusively in a segment-type section of the flywheel. Alternatively, the stator can extent only over a certain angle arrangement and the allocated rotor coils can span the full circumference of 360°.

In especially layered exceptional cases it can be appropriate to construct the flywheel itself as a passive vibration eradicator or to arrange such an eradicator parallel thereto, in order to achieve an optimal noise reduction by a combined active and passive vibration damping. In a preferred variant the flywheel is constructed from an inner rotating ring and an outer rotating ring arranged concentrically thereto, the rotating rings being elastically joined with one another, especially over a rubber layer.

Especially space-saving is a further flywheel variant of the correcting member according to the invention. There the flywheel is inclined with respect to its axis of rotation and has an outer rotating ring arranged elastically hereto; it is expedient that the outer rotating ring is arranged with inclination with respect to the inner rotating ring. If the flywheel has an inner rotating ring and an outer rotating ring arranged elastically thereto, it is expedient that the outer rotating ring is inclined to the inner rotating ring.

Finally, the invention proposes an especially simple turning-rate regulation for the active vibration system of the invention, which has a measurement value receiver for the determination of rotation irregularities of the shaft, a correcting value giver engaged on outlet side (in regulating technology called "regulator") for the generation of correction values and correcting member, for example in the form engaged on outlet side of the correction value giver, which acts on the rotation of the shaft. Deviations from the momentary desired turning rate or the desired angular segment velocity are continuously determined, from these there are derived correction values for the control of the correcting member and finally, by the correcting member there is exerted an accelerating or retarding force on the shaft-end namely in such manner that the desired momentary turning rate is continuously restored and maintained.

In this manner the action of the correcting member leads to an adjustment of the rotation of the shaft, i.e., to a compensation of the interfering vibrations caused by rotation irregularities and therewith to a damping of rotary vibration.

In one preferred embodiment, the measurement-value receiver has a turning-rate sensor mounted directly on the shaft, in particular an inductive or optical sensor, for the measurement of the momentary turning-rate values or of the angular segment velocity of the shaft and a comparator for the formation of the regulating difference. Hereby the rotation irregularities of the shaft to be corrected can be simply determined. The turning-rate sensor is allocated to individual angle segments, for example a disk seated on the shaft or a gear wheel, and measures continuously the momentary values of the turning rate of the individual angle segments. These measurement values are fed to the comparator, which compares them with corresponding desired values. The result of this comparison is the regulating difference, i.e., a measure for the rotation irregularities of the shaft. As respective desired value a measurement value preceding in the sequence of the continuously measured actual values, preferably the measurement value immediately preceding, or the mean value of several of these predecessor measurement values. The correcting member there responds preferably only when the regulating difference exceeds a given threshold value.

Advantageously the momentary values of the turning rate, however, can also be fed to a differentiating member for the recovery of the differential turning rate or of the momentary angle-segment acceleration, which is compared in the comparator with corresponding desired values to determine the regulating difference. Here, too, in the selection of the desired values and the response of the correcting member it is possible to proceed analogously to the preceding desired-value selection and/or analogously to the preceding response behavior of the correcting member.

In another preferred embodiment, the measurement value receiver includes a vibration sensor for the measurement of every type of vibrations which are due to rotation irregularities of the rotating shaft. The vibration sensor is, for example, mounted in a motor vehicle, in any suitable place, say on the body-work or in the interior of a vehicle, preferably in the zone of the vehicle seats, i.e., where the noise level accompanying the interfering vibrations is especially representative of interfering vibrations or is found especially troublesome by the vehicle occupants.

The vibration sensor is preferably a microphone, for example a moving coil microphone, which is preferably arranged in the region of the heat supports of the seats in a motor vehicle, and generates an induced voltage—proportional to the frequency of the troublesome sound waves. Further there come into consideration as vibration sensors vibration-receivers which, for example, are mounted directly on the vehicle body-work, such as inductive receivers, capacitive receivers, piezo-receivers, resistance receivers (stretch-measuring strips), etc.

The measurement value receiver has a processing device coupled with the outlet of the vibration sensor, which is designed for the derivation of the turning-rate momentary values or of the angular segment velocity of the shaft from the measured interference-vibration measurement values. A comparator for the formation of the regulating difference receives this information and operates as described above.

The interfering vibrations detected by the vibration sensor are then fed as measuring signal to the processing device. The latter evaluates in general the amplitudes, frequencies and phases of the received measuring signals and derives from them parameters of the shaft movement, especially the momentary values for the shaft turning rate or the angular segment velocity or the angular segment acceleration. For this derivation it is necessary to know a transfer function which takes into account the influences of the transmission medium, for example, gears, vehicle body-work, air, etc. on the propagation of the interfering vibrations (from the interfering vibration source—namely the shaft driven by the drive unit or located therein—to the measuring site). The transfer function is preferably determined experimentally.

From the interfering vibration measurement values measured with the aid of the vibration sensor at an arbitrary place on the measuring site, then, with the aid of the transfer function for this measuring site there are determined the actual parameters of the shaft movement of the respective rotating shafts. The derived momentary measurement magnitudes are then fed to the comparator, which performs a comparison with the desired values in order to establish, from them, the regulating difference.

The comparator—both in the first alternative measurement value receiver, as well as in the second alternative measurement-value receiver—preferably is a computer which processes various regulating strategies. These may include a characteristic curve field, wherewith all the rotation irregularities occurring—and therewith interference vibration frequencies of the shaft—can be effectively damped.

The correction value giver, engaged on outlet side of the comparator, derives from the regulating difference the correction values for the compensation of the rotation irregularities—and namely in such manner that there is achieved a favorable time course of the regulating process. Preferably the correction value giver is equipped with a device for the signal amplification, so that advantageously the arriving regulating difference signal is forwarded amplified to the correcting member.

The appropriate regulating strategy may depend on the operating type of the drive unit. For example, in a fixed-value regulation a given value, constant in time, of the momentary turning rate is maintained within a certain turning rate range. In a sequence regulation, in contrast, a given value, variable over time, of the turning rate is brought about.

Further, the correcting member is preferably operated in such manner that upon sensing of a regulating difference, it exerts a force on a shaft either impulsively, or uniformly over a relatively long period of time. If the same rotation irregularities should repeat periodically, then it is worth recommending that the correction of the turning rate be controlled in counterphase thereto. In the case of other irregular deviations from the desired turning rate over a relatively long period of time the correcting member acts on the turning rate of the shaft correspondingly uniformly damping or accelerating.

DETAILED DESCRIPTION OF THE PREFERRED EMBODIMENTS

The following detailed description explains the invention in the context of providing active vibration damping for a rotating crankshaft 12 of a motor vehicle internal combustion engine for the sake of simplicity. It should be understood, however, that the invention is not intended to be restricted to this particular implementation, but can be utilized in any drive unit which includes a rotating shaft or the like.

Figure 1:
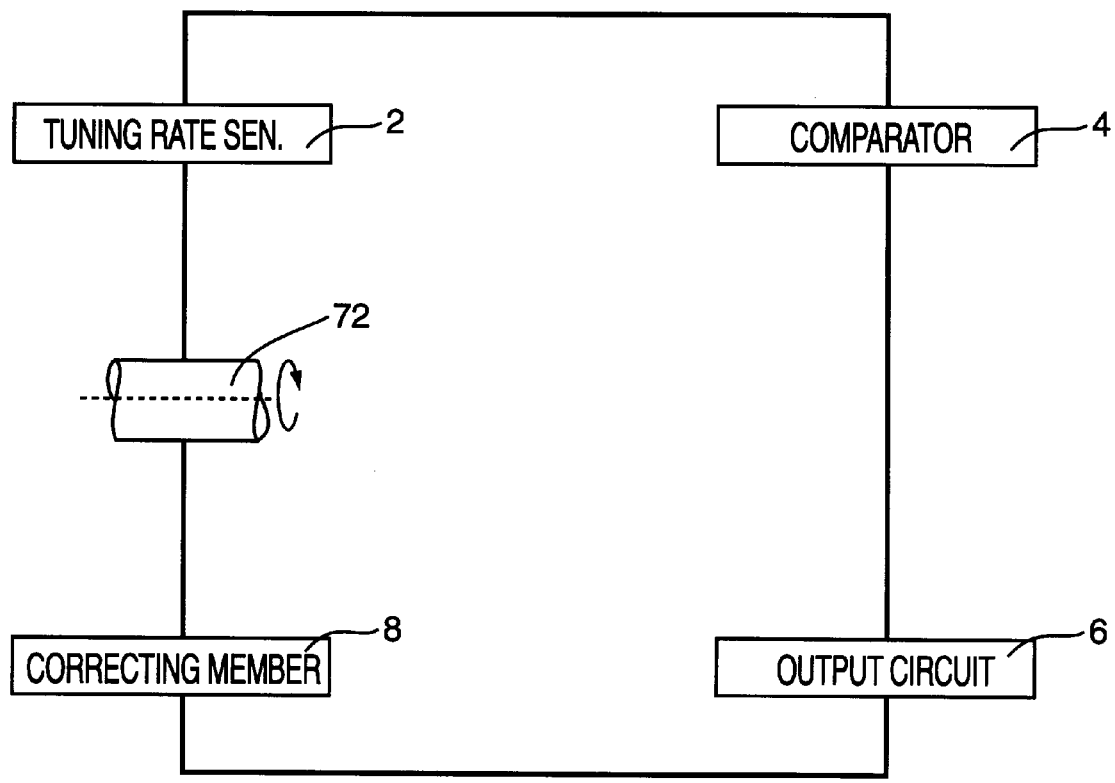
FIG. 1 shows a block diagram representation of an active vibration damping system according to the invention.

FIG. 1 shows an active vibration damping system for compensating crankcase interfering vibrations and noises proceeding therewith. These are due primarily to rotary irregularities of the crankshaft 12 operated by the combustion engine.

According to FIG. 1 a turning-rate sensor 2 is mounted in a suitable place on the crankshaft 12. The turning rate sensor 2 detects several angular segments of the crankshaft 12 and continuously monitors the momentary crankshaft turning or angular rate or angular segment velocity. The sensor 2 may be implemented as a rotation governor or as an inductive turning-rate sensor, which is allocated to individual angle segments of a flywheel or of a gear wheel on the crankshaft 12. An optical turning-rate sensor which measures the momentary shaft turning rate on the basis of an interruption of a light source due to the rotation of the shaft is also envisioned. The shaft turning-rate detection can be obtained in a manner analogous to the wheel turning-rate and slip measurement known from ABS systems.

The turning-rate sensor 2 detects momentary turning rates of the shaft and supplies signals corresponding thereto to a comparator 4. The comparator 4 is preferably implemented as a digital computer, which compares a digitized value corresponding to the momentary turning rate with predetermined desired values. As a result of such comparison, the comparator 4 generates a regulating difference signal corresponding to momentary or periodic rotary irregularity of crankshaft 12. This signal is supplied to an output circuit 6 to generate appropriate correction signals. The output circuit 6 provides the correction signals to a correcting member 8 implemented as a linear electrical machine. The correcting member 8 provides a compensating torque to the crankshaft 12 such that the predetermined momentary angular or turning-rate of the crankshaft is restored.

In this manner disturbances of the crankshaft turning rate are eradicated already in their arising, so that interference vibrations and therewith associated noises in the motor vehicle cannot arise at all.

Figure 2:
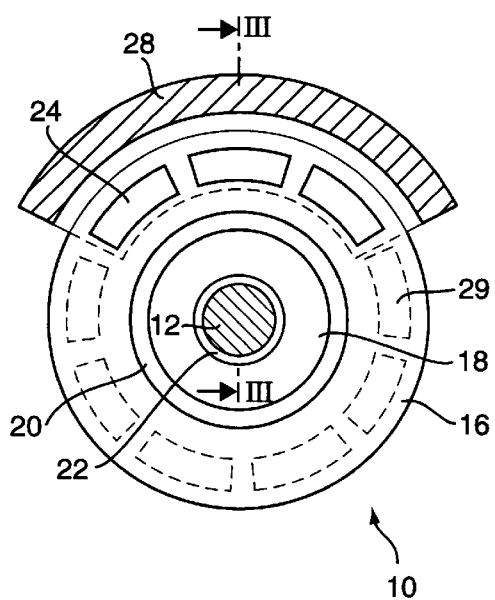
FIG. 2 is a side view of a flywheel and correcting member of the vibration damping system according to the invention in FIG. 1.
Figure 3:
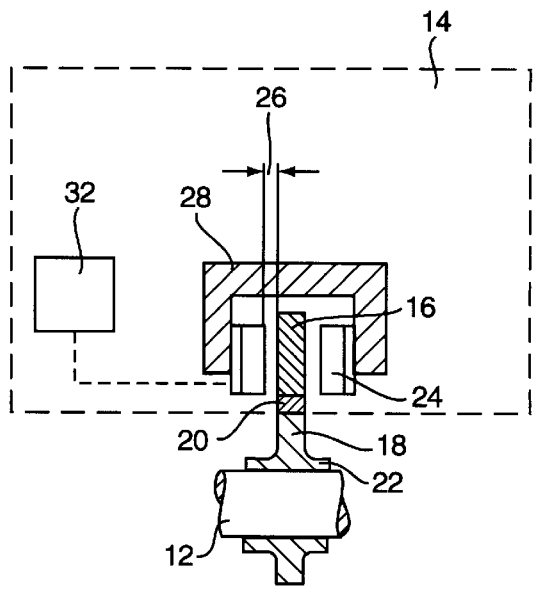
FIG. 3 is a vertical section along the line III—III in FIG. 2.

FIGS. 2 and 3 illustrate one embodiment of the correcting member 8 according to the invention in greater detail. As noted, the correcting member 8 is implemented as a linear motor of the vibration-damping system. The correcting member 8 comprises a disk-shaped flywheel 10 seated on the crankshaft 12 of the internal combustion engine. The flywheel 10 is adapted for use as a movable base element or rotor of a linear motor 14 that receives a thrust or retarding moment.

The flywheel 10 includes an outer rotating ring 16 and an inner rotating ring 18 concentric to the outer ring 1 about an axis of rotation. An annular rubber layer 20 elastically joins the outer and inner rotating rings 16 and 18. The inner rotating ring 18 is fitted to a hub 22 which is seated firmly on the crankshaft 12. In this manner, the flywheel 10 provides a rotary vibration eradicator which counteracts passive rotary irregularities of the crankshaft 12.

A pair of three-coil stator coils 24 flank the opposed sides of the outer rotating ring 16. In the preferred embodiment, the stator coils 24 are uniformly positioned within a segment-type angular section of the flywheel 10. The stator coils 24 are slightly spaced from the outer rotating ring 16 to define an air gap 26. The gap 26 is preferably quite narrow, on the order of between 0.1 and 1.5 mm.

The stator coils 24 are supported by a stationary holding yoke 28 overlapping the flywheel 10 in the manner of a yoke. Preferably, the holding yoke 28 is coupled with on the crankshaft 12 (not shown) and rotatable therewith so that the stator coils 24 and the flywheel are subjected to common vibration. In this way, the reciprocal alignment between the flywheel and stator coils and the gap 26 are substantially constant.

The stator coils 24 receive current in a known manner from a current supply (not shown) based on the correction signal generated by the output circuit 6 and generate a travelling magnetic field which traverses an annularly closed electric field developed in the outer rotating ring 16, and thus induces an annular voltage. As a result, voltage there flows in annular or eddy-current flows in the outer rotating ring 16 having corresponding magnetic fields which are linked with the travelling field of the stator coils 24 to exert a force in tangential direction on the flywheel 10. Depending on the type of the rotary irregularities, the turning direction of the travelling field is chosen relative to the turning direction of the crankshaft such that when unacceptably low momentary turning rates are sensed, a thrust force is applied to the flywheel. When unacceptably high momentary turning rates are sensed, a retarding force is applied until an evening up of the crankshaft rotation or a rotary vibration damping is achieved. The magnitude of thrust or retarding force can be controlled simply by altering the current flowing through the stator coils 24 and thereby adjust of the magnetic flux density through the gap 26.

The outer rotating ring 16 of the flywheel 10 is made of steel and covered with copper plating on its two side surfaces facing the stator coils 24. Hereby high eddy currents can be induced in the side surfaces and correspondingly high thrust or retardation forces. A further heightening of the thrust force can be achieved by the rotor coils 29 arranged on the flywheel 10 and acted upon with a current (as indicated in FIG. 1 by broken lines). There the rotor coils 29 are arranged in such a way that their magnetic field stands perpendicular to the gap plane and they are acted upon in such manner that the fields of the rotor coils 29 and stator coils 24 are maximally strengthened. The field of the rotor coils 29 there can be a unidirectional field or a travelling field adapted to the phases of the field of the stator coils 24. In the last-mentioned case the thrust or retardation force acting on the crankshaft is based above all on the "entrainment" of the field of the rotor coils 29 by the travelling field of the stator coils 24.

As already stated, in the present example of execution the flywheel 10 is additionally constructed as a passive rotary vibration eradicator, the annular rubber layer 20 of which elastically connects the inner rotating ring 18 with the outer rotating ring 16, eradicating possible rotary vibrations. When the elastic connection of the two rotating rings 16, 18—as in the embodiment represented—has electrically insulating properties, then in addition to the vibration damping there is also yielded still an electrical advantage: the annular currents induced in the outer rotating ring 16 cannot pass over into the inner rotating ring 18, and are concentrated, therefore, on the torque-favorable peripheral zone of the flywheel 10.

Figure 4:
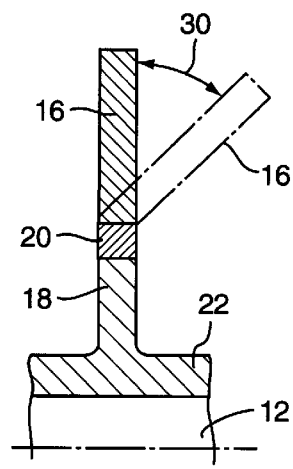
FIG. 4 is a section view analogous to FIG. 3 of a flywheel variant according to the invention.

In FIG. 4, there is represented a variant of the flywheel 10. Here, the outer rotating ring 16 of the flywheel 10 is inclined with respect to the flywheel plane by an angle 30. The other components of the starter according to FIGS. 2 and 3 are arranged in correspondence to this orientation. In this manner the correcting member 14 can be adapted especially simply to the spatial relations in the zone of the flywheel 10 in its construction, without impairing its efficiency.

According to FIG. 3 there is allocated to the correcting member 8 a schematically represented electronic circuit 32 which can drive it in a motor vehicle, besides for turning-rate regulation, for two further types of operation: In actuating the starter key, the correcting member 8—where the linear motor 14—functions as a motor for the starting of the internal-combustion engine; it can then be switched over into a generator operation. In the last-mentioned generator operation the rotor coils 29 are acted upon over slip contacts (not shown here) with a current generating a magnetic field. By reason of the flywheel movement, this field travels relatively to the gap plane and induces or generates in the stator coils 24 a voltage which supplies the vehicle with electric energy in travelling operation. In this manner the linear motor 14 in a motor vehicle can take over also the function of a starter for the starting of the internal-combustion engine and of a light machine for the energy supplying of the vehicle. The circuit 32 is designed expediently as a priority circuit, which switches the linear motor 14 over into the generator operation whenever no turning-rate regulation is required, for example in low turning-rate ranges. obviously, the linear motor 14 can be used for turning-rate regulation and for current generation simultaneously—with lower current yield—because the voltage induced in the stator coils 24 again evokes eddy currents the magnetic fields of which exert a retarding force on the flywheel 10. Accordingly, an active vibration damping system meeting the aforestated objectives has been described. The system detects whether the angular rate of a shaft is different from a known value and provides a compensating torque in response. When implemented as a linear machine into an internal combustion engine for motor vehicles, the system greatly reduces the noises generated. In addition, electrical current may be induced and utilized as necessary.

We claim:

1. A method for active vibration damping a drive unit with at least one rotating shaft, a flywheel seated on the shaft adapted for use as a movable base element of a linear electric motor, a stationary base element of the linear electric motor, and a gap separating the movable base element from the stationary base element, the method including:

sensing rotational irregularities of the shaft and providing a sensing signal;

comparing the sensing signal with selected values and deriving a correction signal; and applying the correction signal to the linear electric motor to increase the rotation of the shaft in a first mode wherein current is supplied to the stationary base element and to decrease the rotation of the shaft in a second mode wherein current is drawn from the stationary base element.

2. The invention as in claim 1 wherein the sensing step includes measuring the momentary angular rate or the angular segment velocity directly from the shaft.

3. The invention as in claim 1 wherein the sensing step includes measuring resulting interference vibrations and deriving a momentary angular rate value or an angular segment velocity value of the shaft.

4. The invention as in claim 1 wherein the correction signal is applied periodically over a relatively long period of time.

5. A drive unit having an active vibration damping system comprising:

at least one rotating shaft;

a flywheel seated on the shaft adapted as a movable base element of a linear electric motor which is operable in a first mode to draw current and operable in a second mode to supply current;

a stationary base element separated from the flywheel by a gap; and a control circuit disposed for sensing rotational irregularities of the shaft and providing control signals to the linear electric motor for generating a compensating magnetic flux in the linear electric motor.

6. The invention as in claim 5 wherein the control circuit comprises:

a measurement sensor disposed for determining rotation irregularities on the shaft and providing sensing signals;

a procesor disposed for comparing the sensing signal with selected correction values and for generating the control signals.

7. The invention as in claim 6 wherein the measurement sensor includes an angular segment turning-rate sensor mounted on the shaft.

8. The invention as in claim 6 wherein the measurement sensor comprises a vibration sensor disposed to detect interference vibrations resulting from turn-rate irregularities of the rotating shaft.

9. The invention as in claim 5 wherein the stationary base element and the flywheel are arranged such that the gap separating the stationary base element and the flywheel can be selectively varied.

10. The invention as in claim 9 further comprising switching means coupled with the linear electric motor and with the control circuit for operating the linear electric motor in the first mode upon the receipt of a first signal from the control circuit and for operating the linear electric motor in the second mode upon the receipt of a second signal from the control circuit.

11. The invention as in claim 10 wherein the shaft is a crankshaft of a motor-vehicle internal-combustion engine, and wherein the control circuit provides third signals to drive the linear electric motor as a starter during a starting operation of the drive unit.

12. The invention as in claim 11 further including a plurality of exciter coils disposed on the stationary base element.

13. The invention as in claim 11 wherein the stationary base element includes spaced exciter coils disposed proximate to at least one side of the flywheel.

14. The invention as in claim 13 wherein the gap separating the stationary base element and the flywheel is arranged in a gap plane and the flywheel includes a layer of material of high conductivity adapted to present an induced magnetic field in the layer perpendicular to the gap plane.

15. The invention as in claim 13 wherein the gap separating the stationary base element and the flywheel is arranged in a gap plane and further comprising a plurality of rotor coils arranged on the flywheel presenting an induced magnetic field perpendicular to the gap plane.

16. The invention as in claim 13 wherein the the flywheel has a T-shaped cross section.

17. The invention as in claim 13 wherein the flywheel is constructed as a passive rotary vibration eradicator.

18. The invention as in claim 17 wherein the flywheel comprises an inner rotating ring, an outer rotating ring arranged concentrically thereto, and a rubber layer elastically joining the outer and inner rotating rings.

19. The invention as in claim 18 wherein the flywheel is inclined with respect to its axis of rotation.

20. The invention as in claim 19 wherein the outer rotating ring is inclined with respect to the inner rotating ring.

* * * * *